(12) United States Patent
Bouchez (10) Patent No.: US 11,196,349 B2
(45) Date of Patent: Dec. 7, 2021

(54) RESONANT DC-DC VOLTAGE CONVERTER

(71) Applicant: Valeo Siemens eAutomotive Norway AS, Drammen (NO)

(72) Inventor: Boris Bouchez, Solbergelva (NO)

(73) Assignee: Valeo Siemens eAutomotive Norway AS, Drammen (NO)

( * ) Notice: Subject to any disclaimer, the term of this patent is extended or adjusted under 35 U.S.C. 154(b) by 79 days.

(21) Appl. No.: 16/526,104

(22) Filed: Jul. 30, 2019

(65) Prior Publication Data

US 2020/0044572 A1    Feb. 6, 2020

(30) Foreign Application Priority Data

Jul. 31, 2018    (FR) ..................................... 1857151

(51) Int. Cl.
| | |
|---|---|
| *H02M 3/335* | (2006.01) |
| *H02M 1/08* | (2006.01) |
| *B60L 50/50* | (2019.01) |
| *H02M 3/158* | (2006.01) |

(52) U.S. Cl.
CPC ....... *H02M 3/33576* (2013.01); *H02M 1/083* (2013.01); *B60L 50/50* (2019.02); *B60L 2210/10* (2013.01); *H02M 3/1586* (2021.05)

(58) Field of Classification Search
CPC ........................................ H02M 3/335–33592
See application file for complete search history.

(56) References Cited

U.S. PATENT DOCUMENTS

| | | | |
|---|---|---|---|
| 2014/0368175 A1 | 12/2014 | Ryoo et al. | |
| 2015/0180350 A1* | 6/2015 | Huang | H02J 9/06 307/66 |

FOREIGN PATENT DOCUMENTS

| | | |
|---|---|---|
| CN | 106936320 A | 7/2017 |
| CN | 106953526 A | 7/2017 |

OTHER PUBLICATIONS

Search Report from French Intellectual Property Office on co-pending FR application (FR1857151) dated Mar. 20, 2019.

* cited by examiner

*Primary Examiner* — Rafael O De Leon Domenech
(74) *Attorney, Agent, or Firm* — Klein, O'Neill & Singh, LLP (57) ABSTRACT

The subject matter of the invention is a three-phase resonant DC-DC voltage converter, notably for an electric or hybrid vehicle, said converter including a plurality of resonant circuits. First inductive elements of the resonant circuits are coupled together and primary windings of the transformers of each resonant circuit are coupled together.

11 Claims, 6 Drawing Sheets

RESONANT DC-DC VOLTAGE CONVERTER

TECHNICAL FIELD

Generally speaking, the invention relates to a resonant DC-DC voltage converter, notably in the field of electrical systems, more specifically configured for the recharging of a power supply battery, notably configured to be on board an automobile vehicle, such as an automobile vehicle with an electric or hybrid engine.

More specifically, in the context of an electric or hybrid vehicle including a low voltage power supply battery for the supply of items of electrical equipment of the vehicle and a high voltage power supply battery to contribute to the propulsion of the vehicle, it is known that an on board charger, commonly designated by those skilled in the art by the acronym OBC, including a resonant DC-DC voltage converter, is used for recharging the high voltage power supply battery.

The invention thereby relates to a resonant DC-DC voltage converter as well as an electric charger including such a converter. The electric charger is in particular on board an electric or hybrid vehicle to enable notably the electrical charging of a high voltage power supply battery of the vehicle and/or the supply of electrical energy by said high voltage power supply battery to the outside of the vehicle, for example to an electrical network, an equipment or a building.

BACKGROUND

As is known, an electric or hybrid automobile vehicle comprises an electric motorisation system, supplied by a high voltage power supply battery via an on board high voltage electrical network, and a plurality of auxiliary items of electrical equipment supplied by a low voltage power supply battery via an on board low voltage electrical network. Thus, the high voltage power supply battery ensures a function of supplying the electrical motorisation system with energy enabling the propulsion of the vehicle. The low voltage power supply battery supplies the auxiliary items of electrical equipment, such as on board computers, window winder motors, a multimedia system, etc. The high voltage power supply battery typically delivers a voltage comprised between 100 V and 900 V, preferably between 100 V and 500 V, whereas the low voltage power supply battery typically delivers a voltage of the order of 12 V, 24 V or 48 V. These two high and low voltage power supply batteries must be able to be charged.

The recharging of the high voltage power supply battery with electrical energy is carried out in a known manner by connecting it, via a direct current high voltage electrical network of the vehicle, to an external electrical supply network, for example the domestic AC electrical supply network. To this end, the high voltage power supply battery is capable of being connected to the domestic AC electrical supply network, for its charging, via an on board electric charger, designated OBC.

Figure 1:
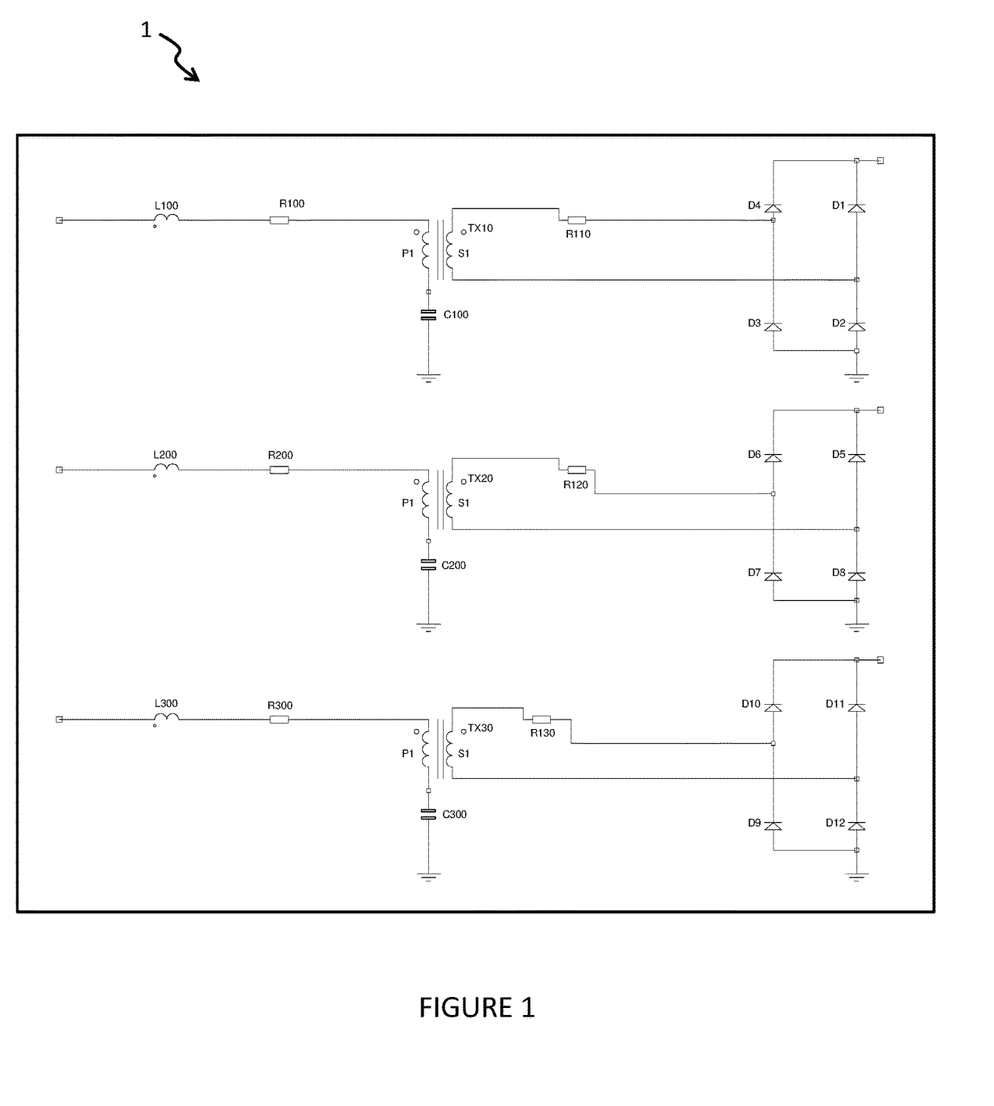
FIG. 1 represents an example of electrical circuit including three interleaved resonant DC-DC converters of the prior art.

In a known solution, such an on board charger mainly comprises a PFC (power factor correction) circuit and a resonant DC-DC voltage converter notably making it possible to form the galvanic insulation between the AC network and the DC network. In an electric or hybrid vehicle application, it may be necessary to use several DC-DC voltage converters in order to be able to produce the necessary power, for example by connecting them in parallel. However, such an arrangement may require the use of filters which cause overheating of the components. A known method for overcoming this drawback consists in interleaving the DC-DC voltage converters, as is represented in FIG. 1 as an example for three converters forming a set 1 of converters. Such an interleaving makes it possible to manage the converters at a same frequency. When a plurality of LLC type DC-DC voltage converters are interleaved in order to manage them at a same frequency, it is observed that each converter remains independent of the others in terms of dispersion of the components, which may lead to different currents in the voltage converters. Consequently, more rapid wear of one of the converters may occur compared to the others, which can lead to malfunctioning of the set of converters and thus constitute an important drawback.

Several topologies of resonant DC-DC voltage converter exist. Among these topologies may be distinguished notably LLC type converters. Such converters include in a known manner a transformer, including a primary part and a secondary part; a capacitor; two coils; and switches which are switched in such a way as to enable the conversion of a first DC voltage delivered to the primary part into a second DC voltage supplied by the secondary part. In order to reduce losses by switching of the switches, it is known to add a capacitor in parallel with each switch, such a configuration enabling what is known by those skilled in the art as ZVS (zero voltage switching) operation. In an LC type circuit, in which Lr notes the inductive element, for example a coil, and Cr notes the resonance capacitor, ZVS operation cannot be implemented in a permanent manner in high voltage applications. Indeed, such ZVS operation requires storing energy in the coil Lr. Yet, at voltage values of 400 V or above, at which such resonant DC-DC voltage converters operate in the electric or hybrid vehicles of today, the energy passing through the switches is such that it can no longer be entirely stored in the coil Lr, which leads to losses by switching at the level of the switches. An LLC type circuit makes it possible to overcome in part these drawbacks, because the addition of a second inductive element, noted Lm, makes it possible to store supplementary energy compared to an LC type circuit. However, when the second inductive element is integrated in the primary part of the transformer, the storage of energy requires a particular configuration of the transformer, the latter not being originally adapted to store energy. Also, in order to enable the primary part of the transformer to store energy, it is known to form an air gap in the core of the transformer, notably in the primary part. Also, in order to enable the primary part of the transformer to store energy, it is known to form an air gap in the core of the transformer, notably in the primary part. In so doing, this makes the transformer more complex and more costly to manufacture, increases electromagnetic perturbations, and may produce what are known by those skilled in the art as "fringing effects" which can lead to thermal losses.

There thus exists the need for a simple, reliable and efficient solution of electrical charger making it possible to overcome at least in part these drawbacks.

SUMMARY

To this end, the invention firstly relates to a resonant DC-DC voltage converter, notably for the recharging of a power supply battery, notably for an electric or hybrid vehicle, said converter including a plurality of resonant circuits, each resonant circuit including:

a first inductive element, a resonance capacitor connected to said first inductive element, a transformer including at least one primary winding and at least one secondary winding, said first inductive element, the resonance capacitor and the primary winding of the transformer being comprised in a branch of the resonant circuit, designated "resonance branch", converter in which, on the one hand, the first inductive elements of the resonant circuits are coupled together and in that, on the other hand, the primary windings of the transformers of the resonant circuits are coupled together.

The coupling of the primary inductive elements together and the primary windings together thus makes it possible to limit the current variations of one phase with respect to another at low levels, notably below 10%. In particular, each resonant circuit is at least of LC type. The converter according to the invention thus has notably a size, a weight and a cost of electromagnetic compatibility filters that is limited whatever the operating range of the converter, that is to say whatever the input voltage-output voltage pairing of the converter. The resonant circuits are notably interleaved.

Preferably, the transformer of each resonant circuit includes a second inductive element, preferably an induction coil, notably connected in parallel with the primary winding in order to form a resonant circuit of LLC type.

Further preferably, the second inductive elements are coupled together in order to limit the current variations of one resonant circuit with respect to another.

According to an aspect of the invention, the first inductive elements and the second inductive elements are induction coils.

Advantageously, the resonance branches of the transformers are connected at the level of a same point called "first neutral point".

Preferably, said first neutral point is connected to the earth on the primary side of the DC-DC converter via a branch including at least one impedance configured to store energy and to enable zero voltage switching of the switches of the resonant DC-DC converter. In particular, said impedance may include one of a resistor, a coil and/or a capacitor in order to enable a storage of energy for the currents of which the harmonics are multiples of rank n (where n is the number of resonant circuits). The resonant DC-DC voltage converter may thereby operate in ZVS independently of the charge applied at the output of the converter. In particular, said impedance includes an inductance in series with a capacitor. The term "output" is taken to mean the terminals of the converter situated on the side of the power supply battery to recharge. This characteristic is particularly suited to the case where the resonant DC-DC voltage converter is an LC converter because it makes it possible to operate in ZVS whatever the operating point of the converter.

Further advantageously, branches, each including one of said secondary windings of the transformers are connected at the level of a same point called "second neutral point".

Preferably, said second neutral point is connected to the earth on the secondary side of the DC-DC converter via a branch including at least one impedance configured to store energy and to enable zero voltage switching of the switches of the resonant DC-DC converter. In particular, said impedance may include one of a resistor, a coil and/or a capacitor in order to enable the operation of the converter in ZVS in the direction of transfer of energy from the secondary to the primary. In particular, said impedance includes an inductance in series with a capacitor.

According to an embodiment, the neutral point is configured so as to have a floating electric potential. In particular, the first neutral point is configured so as to have a floating electric potential. This is notably the case when the first neutral point is only connected to the resonance branches of the resonant circuits. The first inductive element and the resonance capacitor already make it possible to implement zero voltage switching of the switches of said converter, notably when the voltage converter transfers energy from the primary to the secondary. By leaving the first neutral point floating, the number of components in the resonant DC-DC voltage converter is limited. In particular, the second neutral point is configured so as to have a floating electric potential. This is notably the case when the second neutral point is only connected to branches including the secondary windings of the transformers of the resonant circuits. The potential of the second neutral point may notably be left floating when the resonant DC-DC voltage converter is configured to exchange energy only from the primary to the secondary and not from the secondary to the primary, that is to say when the resonant DC-DC voltage converter is not configured to operate in a bidirectional manner. Thus, the number of components in the resonant DC-DC voltage converter is limited. Moreover, the presence of a harmonic current of rank n is avoided, where n is the number of resonant circuits, which makes it possible to limit losses in the resonant DC-DC converter and to limit the effective value of the output current.

Preferably, at least one first resonant circuit of the converter includes a half-bridge input structure including an upper switch and a lower switch connected at the level of a mid-point, said mid-point being connected to the resonance branch of said first resonant circuit.

In an embodiment, each resonant circuit includes a half-bridge input structure including an upper switch and a lower switch connected at the level of a mid-point, said mid-point being connected to the respective resonance branch of said resonant circuit.

In an embodiment, the converter includes n resonant circuits, n being a natural integer greater than or equal to two, and a number p, p being a non-zero natural integer strictly less than n, of said resonant circuits includes a half-bridge input structure including an upper switch and a lower switch connected at the level of a mid-point, said mid-point being connected to the respective resonance branch. Said converter is configured such that in one operating mode:
said switches of the p resonant circuits periodically switch in such a way as to transmit energy through the resonant circuits,
the resonance branches of the n-p other resonant circuits being either in open circuit or connected to an earth of the resonant DC-DC converter, for the duration of this operating mode.

Typically, in resonant voltage converters, the frequency of the switches of the converter must vary over an important range in order to obtain a wide voltage interval at the output from a given input voltage. For example, the frequency can vary from 100 kHz to 1 MHz to obtain a voltage interval of 200 to 500 V from an input voltage of 420 V. This constrains the choice of switches that can be used in the voltage converter, complicates the strategies for managing the switches of the voltage converter, and is not very efficient in terms of output of the voltage converter. The numbers n and p make it possible to address a respective operating range.

According to an alternative, the resonant DC-DC voltage converter includes a control unit, said control unit being configured to control the switches of the n-p resonant circuits in order to place them either in open circuit for the duration of said operating mode or in connection with the earth of the resonant DC-DC converter, notably with the earth at the primary side, for the duration of said operating mode.

According to an aspect of the invention, at least one of the resonant circuits, preferably each resonant circuit, includes a half-bridge output structure including an upper diode and a lower diode connected at the level of a mid-point, said mid-point being connected to the secondary winding of the transformer of said resonant circuit. Alternatively, the diodes may be replaced by switches, notably transistors.

In a preferred manner, the plurality of primary windings is galvanically insulated from the plurality of secondary windings in order not to make the electrical connection between the two.

The invention also relates to an electric charger, notably for an electric or hybrid vehicle, including a converter as described previously.

The invention also relates to an electric or hybrid vehicle including a DC-DC voltage converter such as described previously.

BRIEF DESCRIPTION OF THE DRAWINGS

The invention will be better understood on reading the description that follows, given only as an example, and by referring to the appended drawings given as non-limiting examples, in which identical references are given to similar objects and in which.

It should be noted that the figures explain the invention in a detailed manner for implementing the invention, said figures obviously being able to serve to better define the invention if needs be.

DETAILED DESCRIPTION

In the description that will be made hereafter, the invention will be described in its application to an electric or hybrid automobile vehicle without this limiting the scope of the present invention.

For example, such a vehicle may notably include an electrical machine, an inverter, a set of converters, a high voltage power supply battery, an on board high voltage electrical network, a low voltage power supply battery, an on board low voltage electrical network and a plurality of auxiliary items of electrical equipment.

The set of converters according to the invention is described hereafter in its implementation for an electrical charger, notably on board a vehicle, without however this limiting the scope of the present invention. It will thus be noted that the set of converters could be a DC-DC converter on board the vehicle.

The on board low voltage electrical network connects the low voltage power supply battery and the plurality of auxiliary items of electrical equipment in order that the low voltage power supply battery supplies said auxiliary items of electrical equipment, such as on board computers, window winding motors, a multimedia system, etc. The low voltage power supply battery typically delivers for example a voltage of the order of 12 V, 24 V or 48 V. The recharging of the low voltage battery is carried out from the high voltage battery via a direct current into direct current voltage converter, commonly called DC-DC converter.

The on board high voltage electrical network connects the high voltage power supply battery and the inverter in order that the high voltage power supply battery ensures a function of supplying the electrical machine with energy via the inverter. The high voltage power supply battery typically delivers a voltage comprised between 100 V and 900 V, preferably between 100 V and 500 V. The recharging of the high voltage power supply battery with electrical energy is carried out by connecting it, via the DC high voltage electrical network of the vehicle, to an external electrical network, for example the domestic AC electrical network.

The electrical machine is a rotating electrical machine, preferably configured to drive the wheels of the vehicle from the energy supplied by the high voltage power supply battery. More specifically, the electrical machine is an alternating current electrical machine supplied by a polyphase current source. For example, the electrical machine may be an alternating current motor. In the preferred example described hereafter, the electrical machine is supplied by a three-phase current source without this limiting the scope of the present invention.

In this example, the control of the electrical machine is achieved by means of the inverter. Said inverter makes it possible to convert the direct current supplied by the high voltage power supply battery into three alternating control currents, for example sinusoidal. In other words, the function of the inverter is to transform the direct current delivered by the high voltage power supply battery into three phase currents making it possible to control the electrical machine. Conversely, in another operating mode, the electrical machine can also supply three alternating currents to the inverter in order that said inverter transforms them into a direct current making it possible to charge the high voltage power supply battery.

In FIGS. 2 to 6 are represented five embodiments of the electrical converter according to the invention. The converter 10-1, 10-2, 10-3, 10-4, 10-5 optionally includes a control unit UC.

In these examples, the converter 10-1, 10-2, 10-3, 10-4, 10-5 is a resonant converter configured to convert a direct current voltage into a direct current voltage and includes three resonant circuits. However, it could include a different number of resonant circuits.

Notably, each resonant circuit comprises a transformer, including at least one primary winding P1, P2, P3 and at least one secondary winding S1, S2, S3. Each resonant circuit further includes a resonance capacitor CR1, CR2, CR3 and a first inductive element L1, L2, L3. The primary winding P1, P2, P3, the resonance capacitor CR1, CR2, CR3 and the first inductive element L1, L2, L3 are for example comprised in a branch of the resonant circuit, and are notably in series. For example, the first inductive element L1, L2, L3 may be connected to a terminal of the resonance capacitor CR1, CR2, CR3, the other terminal of the resonance capacitor CR1, CR2, CR3 being connected to a terminal of the primary winding P1, P2, P3 of the transformer, optionally via a resistor (not represented).

The first inductive elements L1, L2, L3, are preferably induction coils. The first inductive elements L1, L2, L3 of the three resonant circuits are coupled together (TX1 coupling in FIGS. 2 to 6). Similarly, the primary windings P1, P2, P3 of the three transformers of the resonant circuits are coupled together (TX2 coupling in FIGS. 2 to 6). A galvanic insulation is formed between the primary windings P1, P2, P3 and the secondary windings S1, S2, S3 of the transformers of the three resonant circuits. A first earth M1 constitutes a reference potential of the primary side converter 10-2, 10-3, 10-4, 10-5, and a second earth M2 constitutes a reference potential of the secondary side converter 10-2, 10-3, 10-4, 10-5.

Each resonant circuit includes a half-bridge output structure including an upper transistor Q7, Q9, Q11 and a lower transistor Q8, Q10, Q12, for example of MOS type, connected at the level of a mid-point connected to the secondary winding S1, S2, S3 of the transformer of said resonant circuit.

In an advantageous manner, a second inductive element (not represented) may be added in parallel with the secondary winding S1, S2, S3 of the transformer of said resonant circuit or in parallel with the primary winding P1, P2, P3 of the transformer of said resonant circuit. This second inductive element is preferably an induction coil. This second inductive element makes it possible to form, with the first inductive element L1, L2, L3 and the resonance capacitor CR1, CR2, CR3, a resonant circuit of LLC type. It will be noted that, in an alternative manner, the second inductive element may be the secondary winding S1, S2, S3 of the transformer of the resonant circuit when said secondary winding S1, S2, S3 has a magnetising inductance, or the primary winding P1, P2, P3 of the transformer of the resonant circuit when said primary winding P1, P2, P3 has a magnetising inductance. Such a magnetising inductance may be formed by an air gap in the core of the transformer.

In the examples illustrated in FIGS. 2 to 6, the resonant circuits are such that the resonance branches that include the primary winding P1, P2, P3 are connected to a first so-called "neutral" point PN1 and the branches that include the secondary windings S1, S2, S3 are connected to a second so-called "neutral" point PN2. The first neutral point PN1 and the second neutral point PN2 contribute to the balancing of the currents circulating in the resonant circuits.

Figure 2:
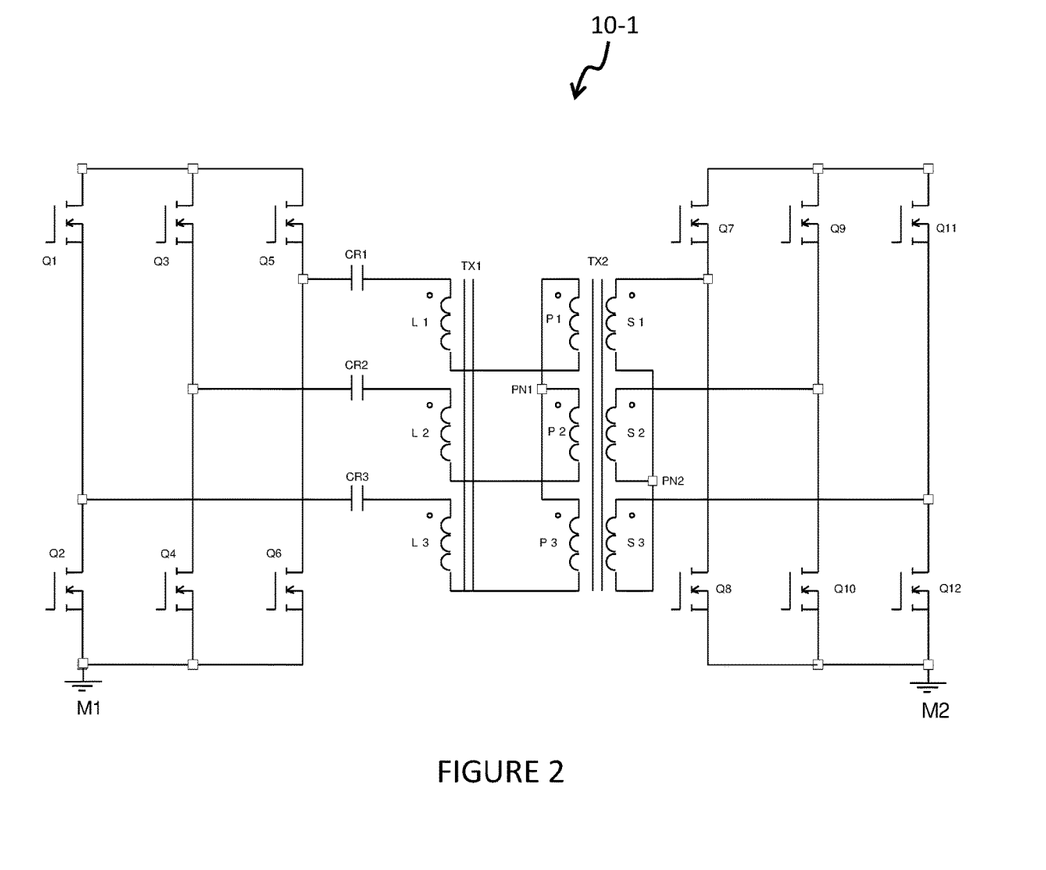
FIG. 2 represents a first embodiment of a converter according to the invention.

In the example illustrated in FIG. 2, the neutral points PN1 and PN2 have a floating electric potential, which makes it possible to limit the number of components of the resonant DC-DC converter. In the examples illustrated in FIGS. 3 to 6, the first neutral point PN1 and/or the second neutral point PN2 are not floating.

In an alternative, the first neutral point PN1 is connected to the first earth M1 of the DC-DC converter via a first so-called "resonance" branch $B_{R1}$ including at least one impedance configured to store energy and to enable zero voltage switching of the switches of the resonant DC-DC converter. The first branch $B_{R1}$ connected to the first neutral point PN1 makes it possible to operate the converter 10-2, 10-3, 10-4, 10-5 in ZVS whatever the operating point of the converter 10-2, 10-3, 10-4, 10-5, when the resonant DC-DC converter transfers energy from the primary to the secondary.

In an alternative, the second neutral point PN2 is connected to the second earth M2 of the DC-DC converter via a second so-called "resonance" branch $B_{R2}$ including at least one impedance configured to store energy and to enable zero voltage switching of the switches of the resonant DC-DC converter. The second branch $B_{R2}$ connected to the second neutral point PN2 makes it possible to operate the converter 10-2, 10-3, 10-4, 10-5 in ZVS whatever the operating point of the converter 10-2, 10-3, 10-4, 10-5, when the resonant DC-DC converter transfers energy from the secondary to the primary.

In the examples illustrated in FIGS. 3 to 6, the first neutral point PN1 is connected to the first earth M1 via an inductance LB1 and a capacitor CB1 and the second neutral point PN2 is connected to the second earth M2 also via an inductance LB2 and a capacitor CB2.

Figure 3:
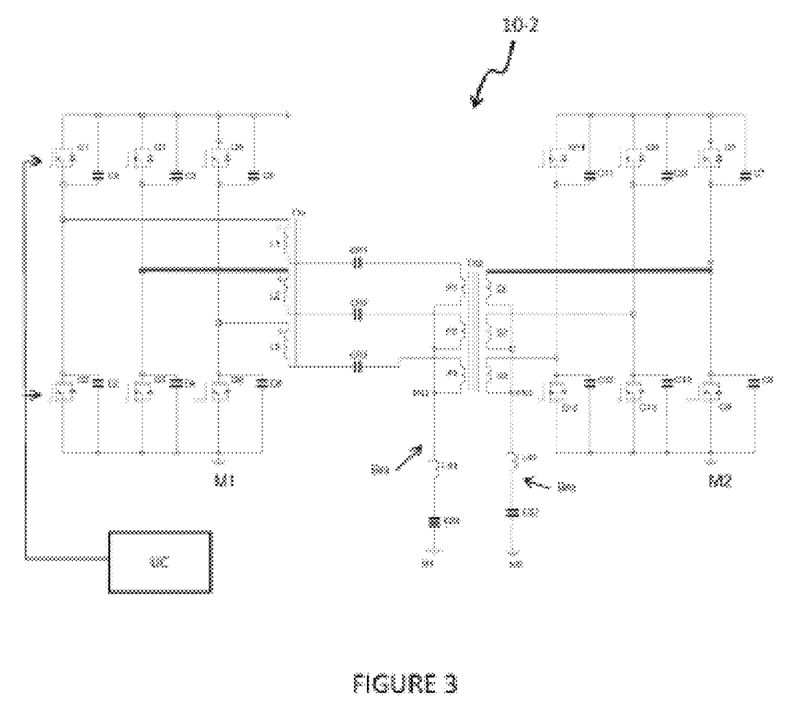
FIG. 3 represents a second embodiment of a converter according to the invention.

In a first embodiment, illustrated in FIG. 2, and a second embodiment, illustrated in FIG. 3, each resonant circuit includes a half-bridge input structure of transistors including an upper transistor Q1, Q3, Q5 and a lower transistor Q2, Q4, Q6, for example of MOS type, connected at the level of a mid-point, said mid-point being connected to the resonance branch of said resonant circuit, in particular at a point different from the first neutral point PN1. This configuration enables the circuits to operate with three input currents, notably on three different phases. Such a configuration makes it possible to operate the converter on the six arms of the three half-bridges of the input structures of the three resonant circuits, in a three-phase manner, in order notably to reduce at one and the same time the RMS current, the size, the weight and the costs of the electromagnetic compatibility filters. In particular, the transistors Q1-Q6 periodically switch in such a way as to transmit energy through the resonant DC-DC converter 10-2.

Figure 4:
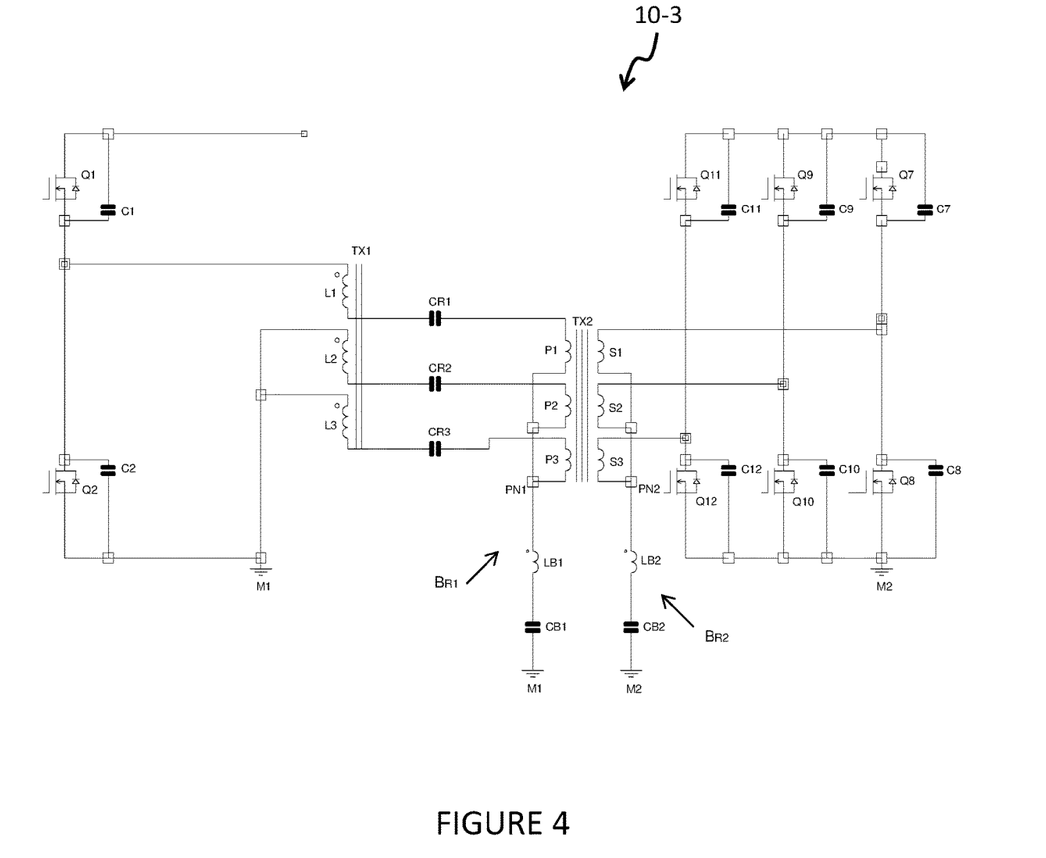
FIG. 4 represents a third embodiment of a converter according to the invention.

In a third embodiment illustrated in FIG. 4, only the first resonant circuit (the resonant circuit placed at the top in the figures) comprises a half-bridge input structure of transistors Q1, Q2, the mid-point of said input structure being connected to the resonance branch. The second resonant circuit (resonant circuit placed in the middle in the figures) and the third resonant circuit (resonant circuit placed at the bottom in the figures) are without half-bridge input structure of transistors, their resonance branches both being connected to the first earth M1. Such a configuration makes it possible to operate the converter 10-3 on two arms of switches in a single phase manner (voltage divider bridge). In particular, only the transistors Q1, Q2 of the first resonant circuit periodically switch in such a way as to transmit energy through the resonant DC-DC converter 10-3.

Figure 5:
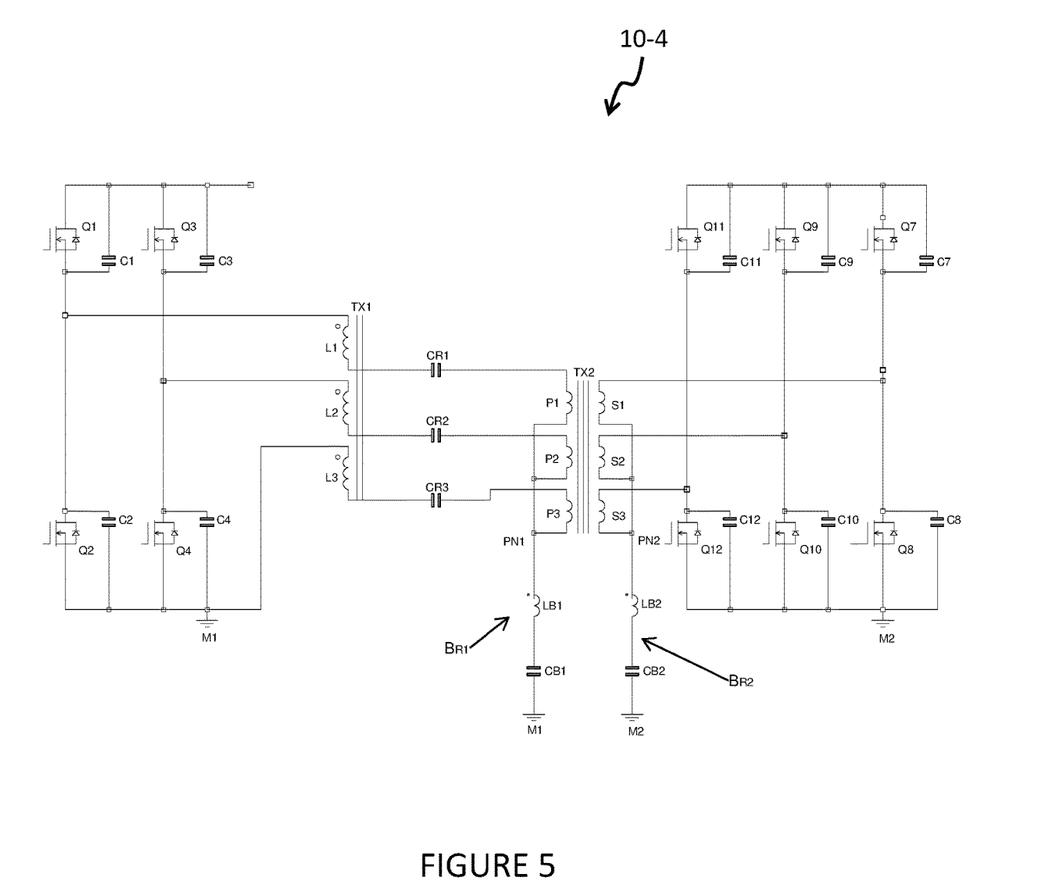
FIG. 5 represents a fourth embodiment of a converter according to the invention.

In a fourth embodiment illustrated in FIG. 5, the first resonant circuit and the second resonant circuit each comprise a half-bridge input structure of transistors Q1/Q2 and Q3/Q4. The mid-point of the input structure of the first resonant circuit is connected to the resonance branch of the first resonant circuit. The mid-point of the input structure of the second resonant circuit is connected to the resonance branch of the second resonant circuit. The resonance branch of the third resonant circuit is connected to the first earth M1. Such a configuration makes it possible to operate the converter 10-3 on four arms of switches, in a two phase manner. In particular, only the transistors Q1, Q2, Q3, Q4 of the first and the second resonant circuits periodically switch in such a way as to transmit energy through the resonant DC-DC converter 10-4.

Figure 6:
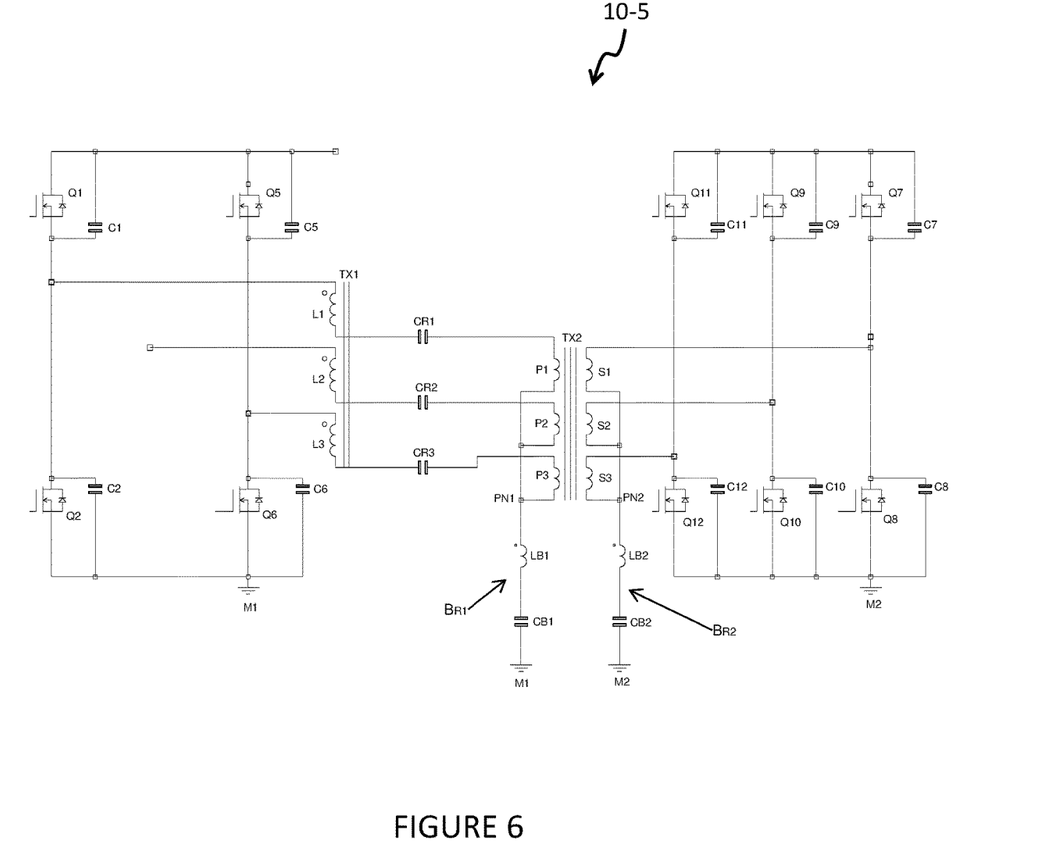
FIG. 6 represents a fifth embodiment of a converter according to the invention.

In the fifth embodiment illustrated in FIG. 6, the first resonant circuit and the third resonant circuit each comprise a half-bridge input structure of transistors Q1/Q2 and Q5/Q6. The mid-point of the input structure of the first resonant circuit is connected to the resonance branch of the first resonant circuit. The mid-point of the input structure of the third resonant circuit is connected to the resonance branch of the third resonant circuit. In the second resonant circuit, the resonance branch is in open circuit. One end VP2 of the resonance branch thereby constitutes a floating potential point. Such a configuration makes it possible to operate the converter on four arms of switches, in a two-phase manner. In particular, only the transistors Q1, Q2, Q5, Q6 of the first and the third resonant circuits switch periodically in such a way as to transmit energy through the resonant DC-DC converter 10-5.

The first to fifth embodiments are each advantageous over an operating range of the resonant DC-DC converter.

In an alternative, the converter illustrated in FIG. 3 includes a control unit UC which is configured to control the branching of the first inductive elements L1, L2, L3 of the resonant circuits according to different configurations here corresponding to the different embodiments described in FIGS. 4 to 6 in order to switch between different operating modes. In other words, the control unit UC makes it possible to obtain the configurations illustrated in FIGS. 4 to 6 from the circuit illustrated in FIG. 3. For example, the circuit illustrated in FIG. 4 may be obtained from that illustrated in FIG. 3, by maintaining closed the lower switches Q4, Q6 of the second and third resonant circuits and by maintaining open the upper switches Q3, Q5 of the second and third resonant circuits. The switches Q1, Q2 of the first resonant circuit periodically switch in such a way as to transmit energy through the resonant DC-DC converter. Thus, a wider operating range is obtained compared to an operation in which all the half-bridge input structures of transistors periodically switch to transfer energy through the resonant DC-DC voltage converter. It is moreover possible to implement degraded modes. The converter illustrated in FIG. 2 may include a similar control unit UC making it possible to obtain the input structure configurations of FIGS. 4 to 6.

In the examples illustrated in FIGS. 3 to 6, the switches Q1, Q2, Q3, Q4, Q5, Q6, Q7, Q8, Q9, Q10, Q11, Q12 are connected respectively in parallel with a capacitor C1, C2, C3, C4, C5, C6, C7, C8, C9, C10, C11, C12 in order to ensure ZVS operation.

The invention claimed is:

1. A resonant DC-DC voltage converter, notably for an electric or hybrid vehicle, said converter including a plurality of resonant circuits, each resonant circuit including:
   a first inductive element,
   a resonance capacitor connected to said first inductive element,
   a transformer including at least one primary winding and at least one secondary winding, said first inductive element, the resonance capacitor and the primary winding of the transformer being comprised in a branch of the resonant circuit, designated "resonance branch",
   converter in which the first inductive elements of the resonant circuits are coupled together, and the primary windings of the transformers of the resonant circuits are coupled together,
   wherein the primary windings of the resonance branches of the converter are all connected to a first neutral point, the first neutral point being connected to a ground of the DC-DC converter via at least one of the resonance branches including at least one impedance configured to store energy and to enable zero voltage switching of the switches of the resonant DC-DC converter.

2. The converter according to claim 1, in which the transformer of each resonant circuit includes a second inductive element in order to form a resonant circuit of LLC type.

3. The converter according to claim 1, in which the secondary windings are coupled together.

4. The converter according to claim 1, in which branches, each including one of said secondary windings of the transformers, are all connected to a second neutral point.

5. The converter according to claim 4, in which the second neutral point is connected to a ground of the DC-DC converter via a branch including at least one impedance configured to store energy and to enable zero voltage switching of the switches of the resonant DC-DC converter.

6. The converter according to claim 5, in which said impedance includes an inductance in series with a capacitor.

7. The converter according to claim 1, in which the first neutral point is configured so as to have a floating electric potential.

8. The converter according to claim 1, in which, at least one first resonant circuit of the converter includes a half-bridge input structure including an upper switch and a lower switch wherein both the upper switch and the lower switch are connected to a mid-point node, said mid-point node being connected to the resonance branch of said first resonant circuit.

9. The converter according to claim 7, in which each resonant circuit includes a half-bridge input structure including an upper switch and a lower switch connected at the level of a mid-point node, said mid-point node being connected to the respective resonance branch of said resonant circuit.

10. The converter according to claim 7, including n resonant circuits, n being a natural integer greater than or equal to two, and in which a number p, p being a non-zero natural integer strictly less than n, of said resonant circuits includes a half-bridge input structure including an upper switch and a lower switch connected at the level of a mid-point, said mid-point being connected to the respective resonance branch,
   said converter being configured such that in one operating mode,
   said switches of the p resonant circuits periodically switch in such a way as to transmit energy through the resonant circuits, and
   the resonance branches of the n-p other resonant circuits being either in open circuit or connected to a ground of the resonant DC-DC converter, for the duration of this operating mode.

11. The converter according to claim 10 including a control unit, said control unit being configured to control the switches of the n-p resonant circuits in order to place them either in open circuit for the duration of said operating mode or in connection with the earth of the resonant DC-DC converter for the duration of said operating mode.

* * * * *